(12) United States Patent
Kolmhofer

(10) Patent No.: US 7,806,249 B2
(45) Date of Patent: Oct. 5, 2010

(54) RADAR SYSTEM CHARACTERISTIC DETERMINATION

(75) Inventor: Erich Kolmhofer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 25 days.

(21) Appl. No.: 12/211,111

(22) Filed: Sep. 16, 2008

(65) Prior Publication Data

US 2010/0066591 A1    Mar. 18, 2010

(51) Int. Cl.
    *B65G 47/26* (2006.01)
(52) U.S. Cl. ...................... 198/418; 342/165
(58) Field of Classification Search ............ 342/137
    See application file for complete search history.

(56) References Cited

U.S. PATENT DOCUMENTS

| | | | |
|---|---|---|---|
| 5,448,643 A * | 9/1995 | Parker | 380/59 |
| 5,977,906 A * | 11/1999 | Ameen et al. | 342/174 |
| 6,768,455 B1 * | 7/2004 | Werntz et al. | 342/368 |
| 2004/0099775 A1 * | 5/2004 | Zheng et al. | 248/206.3 |
| 2005/0275585 A1 * | 12/2005 | Shima et al. | 342/174 |
| 2006/0107816 A1 * | 5/2006 | Vinoly et al. | 84/47 |
| 2006/0220950 A1 * | 10/2006 | Morgan et al. | 342/165 |
| 2006/0244579 A1 * | 11/2006 | Raab | 340/438 |
| 2007/0030955 A1 * | 2/2007 | Eilbert et al. | 378/87 |
| 2007/0056379 A1 * | 3/2007 | Nassar et al. | 73/774 |

* cited by examiner

*Primary Examiner*—Thomas H. Tarcza
*Assistant Examiner*—Timothy A Brainard
(74) *Attorney, Agent, or Firm*—Patterson Thuente Christensen Pedersen, P.A.

(57) ABSTRACT

The invention is related to radar system characterization. In one embodiment, a radar module characterization system comprises a target, a conveyor comprising at least one connector configured to removably couple a radar module to the conveyor and to linearly displace the radar module relative to the target, and a control system communicatively coupled to the conveyor. In another embodiment, a method comprises linearly displacing a radar module relative to a target, transmitting a signal from the radar module toward the target, and determining a characteristic of the radar module based on a reflection of the signal from the target.

22 Claims, 2 Drawing Sheets

RADAR SYSTEM CHARACTERISTIC DETERMINATION

BACKGROUND OF THE INVENTION

For radar systems which are to have angular resolution, determination of a particular system's radiation diagram for the antennas is typically necessary. Such radar systems include automotive and other high-volume radar systems.

The radiation diagram of a radar system is usually determined and calibrated during a test portion of the manufacturing process. Each radar system to be tested is mounted on a rotatable table, or turntable, and test signals are sent toward a fixed radar reflector. Readings are then taken and the individual antenna diagram of each system is recorded as a function of the angle of rotation. A significant disadvantage of such a test procedure is that each radar system must be handled in order to be individually mounted on the turntable, which is inefficient and expensive.

SUMMARY OF THE INVENTION

The invention is related to radar system characterization. In one embodiment, a radar module characterization system comprises a target, a conveyor comprising at least one connector configured to removably couple a radar module to the conveyor and to linearly displace the radar module relative to the target, and a control system communicatively coupled to the conveyor.

In another embodiment, a method comprises linearly displacing a radar module relative to a target, transmitting a signal from the radar module toward the target, and determining a characteristic of the radar module based on a reflection of the signal from the target.

BRIEF DESCRIPTION OF THE DRAWINGS

The invention may be more completely understood from the following detailed description of various embodiments in connection with the accompanying drawings, in which.

Figure 1:
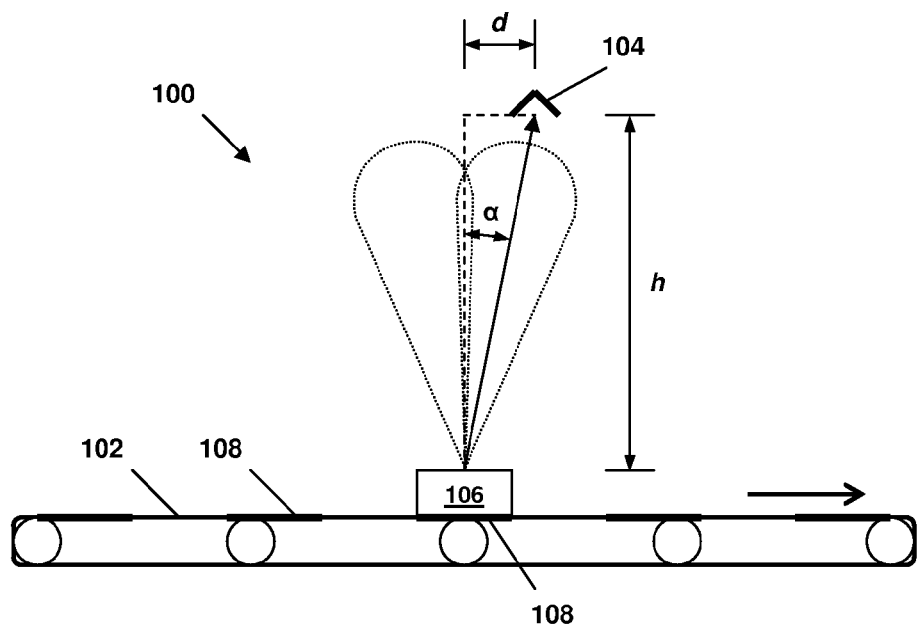
FIG. 1 is a diagram of a system according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to systems and methods for radar system characteristic determination. Embodiments of the invention can simplify system characteristic determination, testing and calibration while improving efficiency, reducing costs, and maintaining or improving accuracy. The invention can be more readily understood by reference to FIGS. 1-4 and the following description. While the invention is not necessarily limited to the specifically depicted application(s), the invention will be better appreciated using a discussion of exemplary embodiments in specific contexts.

One embodiment of a characteristic determination system 100 is depicted in FIG. 1. System 100 comprises a conveyor 102, such as a conveyor belt or track, and a target 104. In one embodiment, target 104 comprises a reflector, a mirror, or some other suitable object. In another embodiment, target 104 comprises a measurement receiver. Target 104 is fixed at some distance away from conveyor 102 such that a distance h can be defined between target 104 and a radar module under test 106. In one embodiment, target 104 is spaced horizontally from conveyor 102, while in another embodiment target 104 is spaced vertically from conveyor 102. In various other embodiments, some other spatial relationship exists between target 104 and conveyor 102.

Conveyor 102 provides for efficient placement and handling of a plurality of radar modules 106 for individual analysis. Conveyor 102 comprises at least one connector 108 to selectively and removably couple radar module 106 to conveyor 102 during a test or analysis procedure. In the embodiment depicted in FIG. 1, conveyor 102 comprises a plurality of connectors 108. Connector 108 can comprise a contact, a plurality of contacts, a male and/or female coupler, a clasp, a harness, or some other suitable type of connector or combination of connectors configured to mechanically secure connector 108 to conveyor 102 while also providing an electrical connection to a control system, which is discussed in more detail below with reference to FIG. 4. Connector 108 can therefore be adapted to couple a variety of different types of radar or other modules 106 to conveyor 102, from simple radar solutions comprising electronics, one or more antennas and other components in an enclosure to advanced integrated single-chip and/or packaged semiconductor solutions.

Figure 2:
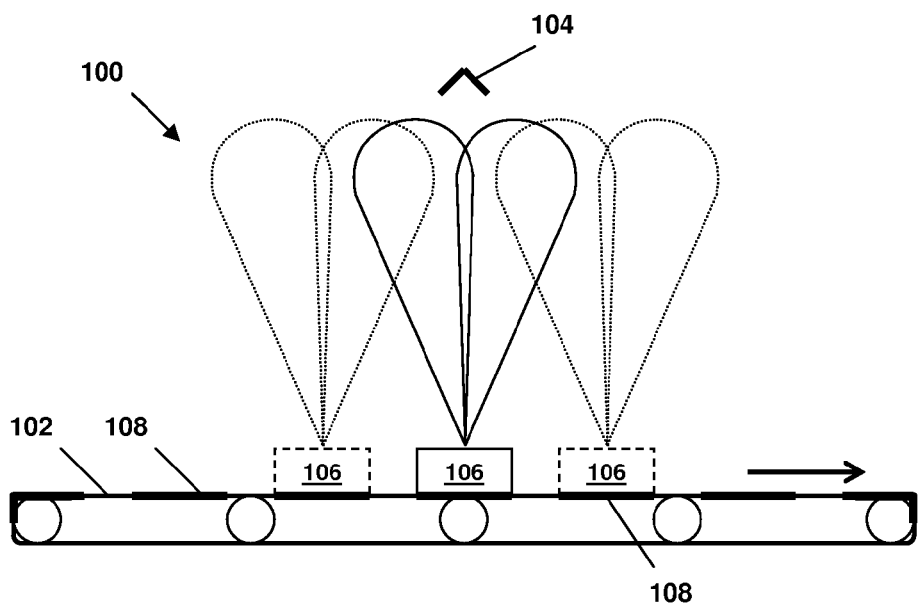
FIG. 2 is a diagram of a system according to one embodiment.

In one embodiment, radar modules 106 are automatically placed onto conveyor 102 and coupled to connector 108, such as during part of an automated production process. In another embodiment, radar modules 106 are manually placed onto conveyor 102. Adjacent radar modules 106, such as are depicted in FIG. 2, are spaced such that desired characteristic determination of each module 106 can be carried out without interference or limitation in one embodiment. In another embodiment, adjacent or closely spaced radar modules 106 can be simultaneously characterized, such as by using different frequencies and/or operating the modules 106 sequentially at short intervals in various embodiments.

Figure 3:
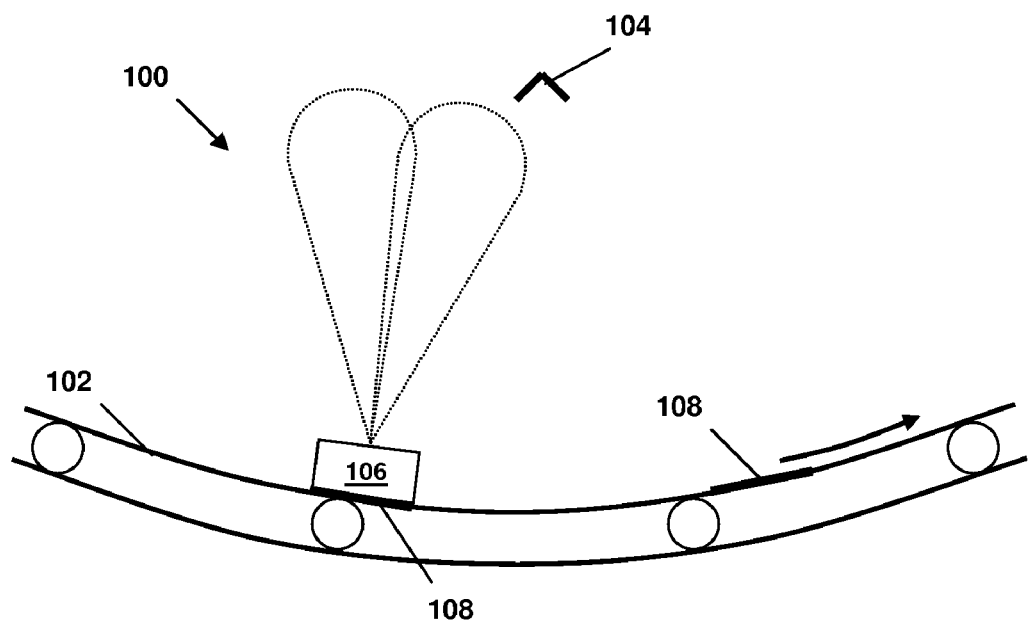
FIG. 3 is a diagram of a system according to one embodiment.

Conveyor 102 is adapted to move radar modules 106 through a characteristic determination, test and/or calibration system at an appropriate speed. In one embodiment, conveyor 102 conveys radar modules 106 in a continuous manner. In another embodiment, conveyor 102 conveys radar modules 106 in a series of discrete steps. In FIG. 3, conveyor 102 moves radar modules 106 through an arc around target 104, in contrast to the linear path of conveyor 102 in the embodiments of FIGS. 1 and 2. The angle and length of the arc of conveyor 102 can vary in embodiments. Such a configuration provides for the sensing and determination of a greater angular range while also reducing errors attributable to a varying distance between radar module 106 and target 104, as the distance between the two remains constant or does not vary for a longer period of time.

As each radar module 106 moves through system 100 and passes target 104, one or more antenna characteristics can be determined from a signal strength of a reflection from target 104 when radar module 106 is at one or more known positions. For example, an antenna characteristic of radar module 106 can be determined from a signal as a function of the lateral displacement of radar module 106 a distance d relative to target 104. From this displacement, an angle α can be determined. Although a dimension of conveyor 102 and/or the spacing of adjacent radar modules 106 can affect the angular range which can be sensed in system 100, in one embodiment the angular range is at least about ±15 degrees. The distance between radar module 106 and target 104, as well as any variation in the distance, can also be considered and accounted for in subsequent data interpretation and analysis. In an embodiment in which target 104 comprises a measuring receiver, information and characteristics related to radar module 106 can be determined from signals received by target 104.

Figure 4:
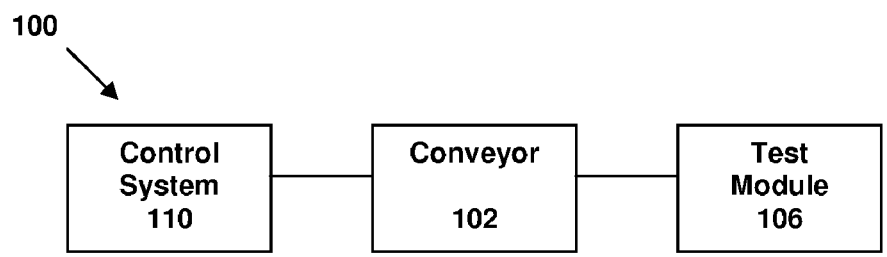
FIG. 4 is a block diagram of a system according to one embodiment.

In one embodiment, and referring to FIG. 4, conveyor 102 is controlled by a control system 110. Control system 110 is configured to control the movement of conveyor 102 within system 100. In various embodiments, control system 110 is also communicatively coupled to radar module 106 via conveyor 102 and connector 108. In these embodiments, control system 110 can be further configured to control test signal transmissions by radar module 106. For example, when characterizing a radar module 106 having a mechanical or electrical sweep antenna, control system 110 can direct module 106 to conduct a beam sweep at a series of measured positions relative to target 104 along conveyor 102.

In various embodiments, control system 110 is further adapted to receive, process and analyze resultant data and information, such as received signal strength, from radar module 106. In other embodiments, data can be processed within radar module 106 itself. In these embodiments, radar module 106 can receive information from control system 110 relating to position and other factors necessary for an analysis or characterization. In still other embodiments, data processing can be shared between radar module 106 and control system 110.

In one embodiment, the result of the analysis can be a pass/fail indication from control system 110 for a particular radar module 106 under test. Such an indication can be relevant to radar modules 106 which comprise a single fixed antenna beam, for example in radar systems for industrial application which measure a target distance but not direction. In various other embodiments, the result of the analysis can be data or information that characterizes a particular radar module 106, and this data or information can be stored with that radar module 106. For example, radar systems with multiple or sweep antenna beams can measure both distance and direction of a target, and the characterizing data obtained within system 100 can be stored, as this data can be used to obtain sufficient angular precision during use.

Various embodiments of the invention thus provide efficient, cost-effective characterization and test systems for radar systems. Embodiments of the invention can also be adapted for other high-frequency and communications systems in which system and/or component characterization, test and/or analysis are needed or desired. In any embodiment, the characterization and test systems can be part of or integrated within a production or test system or facility or can comprise stand-alone or modular systems for post-processing on- or off-site.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A radar module characterization system comprising:
   a target;
   a conveyor comprising a plurality of connectors and configured to linearly displace the plurality of connectors relative to the target, each of the plurality of connectors configured to removably couple a radar module comprising an antenna to the conveyor; and
   a control system communicatively coupled to the conveyor and configured to determine a characteristic of the antenna from a signal transmitted by the radar module to and reflected by the target.

2. The system of claim 1, wherein the at least one connector comprises a mechanical connector.

3. The system of claim 1, wherein the at least one connector comprises an electrical connector.

4. The system of claim 3, wherein the at least one connector is adapted to communicatively couple the control system and the radar module.

5. The system of claim 1, wherein the target is fixed and comprises a reflector.

6. The system of claim 1, wherein the target comprises a receiver.

7. The system of claim 1, wherein the plurality of connectors are spaced apart from one another.

8. The system of claim 1, wherein the conveyor is configured to linearly displace the radar module relative to the target in a continuous manner.

9. The system of claim 1, wherein the conveyor is configured to linearly displace the radar module relative to the target in a series of discrete steps.

10. The system of claim 1, wherein the conveyor is configured to linearly displace the radar module relative to the target along a path, and wherein at least a portion of the path comprises an arc.

11. The system of claim 1, wherein the conveyor comprises one of a belt or a track.

12. A method comprising:
    linearly displacing a plurality of radar modules relative to a target;
    transmitting a signal from each of the plurality of radar modules toward the target; and
    determining a characteristic of each radar module based on a reflection of the signal originating from that radar module from the target.

13. The method of claim 12, wherein linearly displacing the plurality of radar modules is carried out by a conveyor.

14. The method of claim 13, further comprising removably coupling the plurality of radar modules to the conveyor.

15. The method of claim 12, wherein adjacent radar modules transmit the signal at different frequencies.

16. The method of claim 12, wherein transmitting further comprises sequentially operating the plurality of radar modules.

17. The method of claim 12, wherein linearly displacing further comprises linearly displacing the plurality of radar modules in a continuous manner.

18. The method of claim 12, wherein linearly displacing further comprises linearly displacing the plurality of radar modules in a series of steps.

19. The method of claim 12, wherein determining a characteristic further comprises determining a characteristic of an antenna as a function of a lateral displacement of the radar module relative to the target.

20. The method of claim 19, wherein determining a characteristic further comprises determining an angle between the antenna of at least one of the radar modules and the target.

21. The method of claim 12, further comprising transmitting information related to the reflection to a control system.

22. The method of claim 12, wherein transmitting further comprises conducting a beam sweep at a series of positions of at least one of the radar modules relative to the target.

* * * * *